(12) United States Patent
Adi et al.

(10) Patent No.: US 12,372,385 B2
(45) Date of Patent: Jul. 29, 2025

(54) FLOW METER AND ASSEMBLY METHOD THEREFOR

(71) Applicant: INTEGRA METERING AG, Therwil (CH)

(72) Inventors: Jean-Pierre Adi, Albi (FR); Alain Ramond, Toulouse (FR); Mathieu Poque, Villefrakche-Delauragais (FR); Marwan Zeidan, Montauban (FR)

(73) Assignee: INTEGRA METERING AG, Therwil (CH)

( * ) Notice: Subject to any disclaimer, the term of this patent is extended or adjusted under 35 U.S.C. 154(b) by 167 days.

(21) Appl. No.: 18/011,112

(22) PCT Filed: Jun. 17, 2021

(86) PCT No.: PCT/FR2021/051100
§ 371 (c)(1),
(2) Date: Dec. 16, 2022

(87) PCT Pub. No.: WO2021/255398
PCT Pub. Date: Dec. 23, 2021

(65) Prior Publication Data
US 2023/0280193 A1    Sep. 7, 2023

(30) Foreign Application Priority Data
Jun. 19, 2020 (FR) ...................... 20 06425

(51) Int. Cl.
*G01F 1/667* (2022.01)
*G01F 1/66* (2022.01)
*G01F 15/14* (2006.01)

(52) U.S. Cl.
CPC .............. *G01F 1/667* (2013.01); *G01F 1/662* (2013.01); *G01F 15/14* (2013.01)

(58) Field of Classification Search
CPC .......... G01F 1/667; G01F 1/662; G01F 15/14; G01F 15/18
See application file for complete search history.

(56) References Cited

U.S. PATENT DOCUMENTS

2016/0377468 A1* 12/2016 Satou .................. G01F 1/662
73/861.27

FOREIGN PATENT DOCUMENTS

| CN | 210533453 |   | 5/2020 |
| CN | 210533453 | U * | 5/2020 |

(Continued)

OTHER PUBLICATIONS

International Search Report dated Oct. 8, 2021.

*Primary Examiner* — Paul M. West
(74) *Attorney, Agent, or Firm* — IPSILON USA, LLP

(57) ABSTRACT

The invention concerns a flowmeter including a pipe (2) and two ultrasound transducers mounted facing one another and oriented in a measurement direction at a non-zero angle less than 90° to a longitudinal axis of the pipe and including a casing (8) including a main receptacle (9) mounted on said pipe, a first sleeve (10) and a second sleeve (11) extending in a direction orthogonal to the longitudinal axis of said pipe, projecting from a bottom of the main receptacle (9) and on either side of said pipe, each sleeve (10, 11) being configured so as to cover said first or second ultrasound transducer at least partly so as to delimit a receiving internal volume, the main internal volume of the main receptacle being in communication with said receiving internal volumes of said first and second ultrasound transducers.

The invention also concerns a method of assembling a flowmeter of this kind.

13 Claims, 5 Drawing Sheets

(56) References Cited

FOREIGN PATENT DOCUMENTS

DE    102011101257         11/2012
DE    102011101257 A1  *  11/2012   ............. G01F 1/662

* cited by examiner

[Fig. 1]
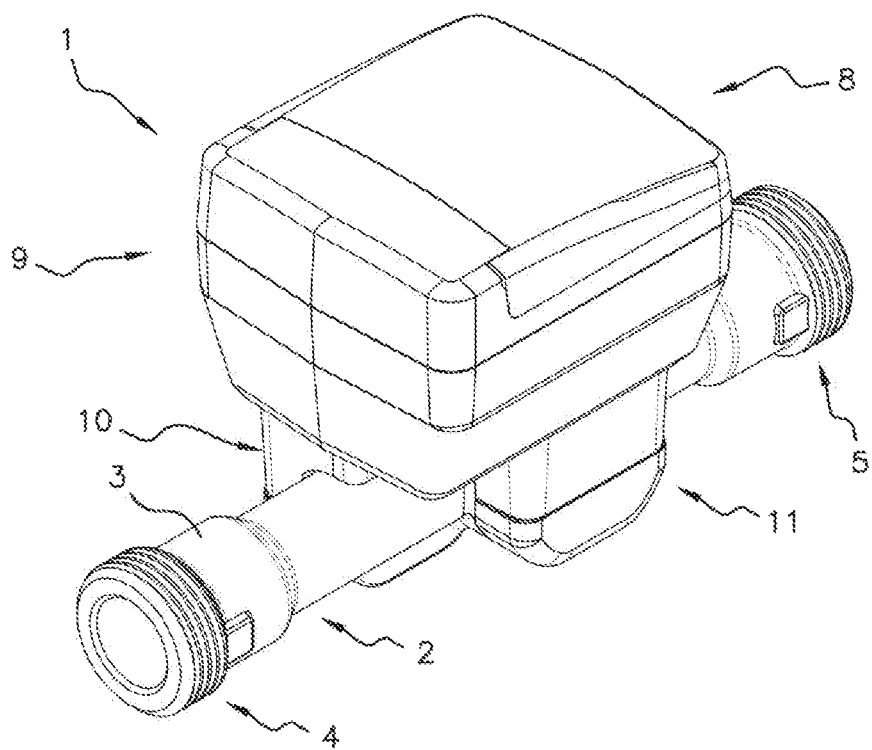
[Fig. 2]
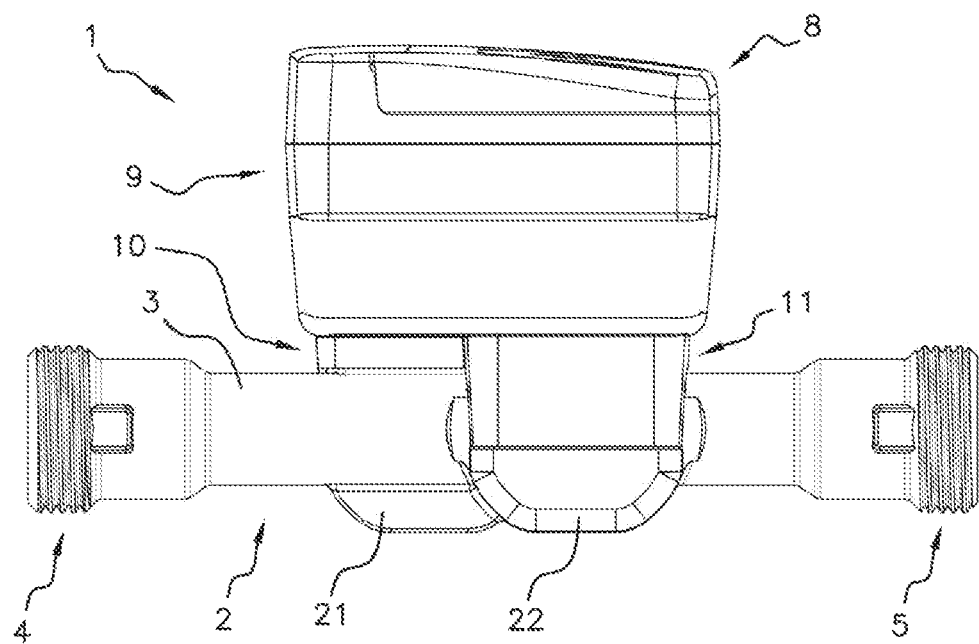

[Fig. 3]
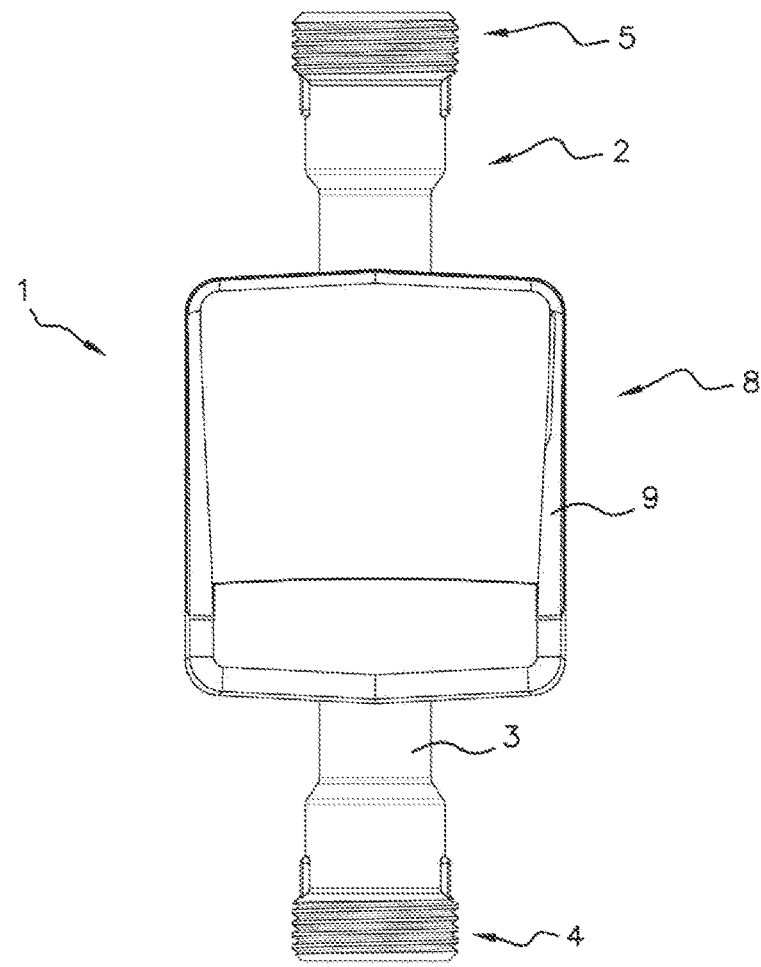
[Fig. 4]
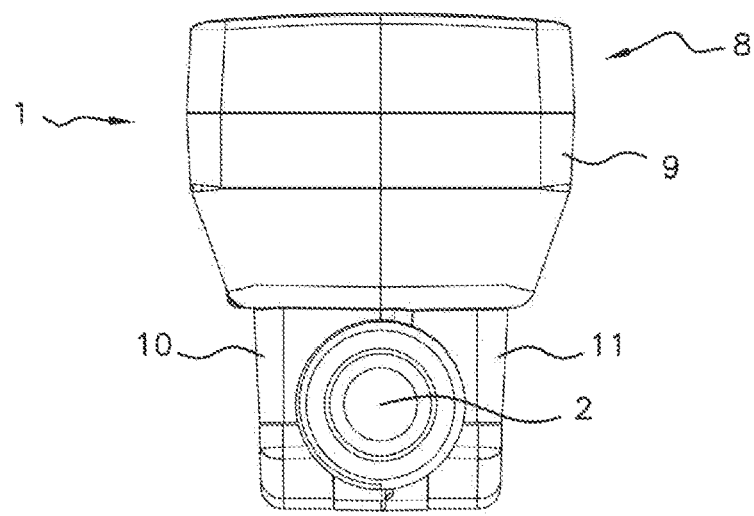

[Fig. 5]
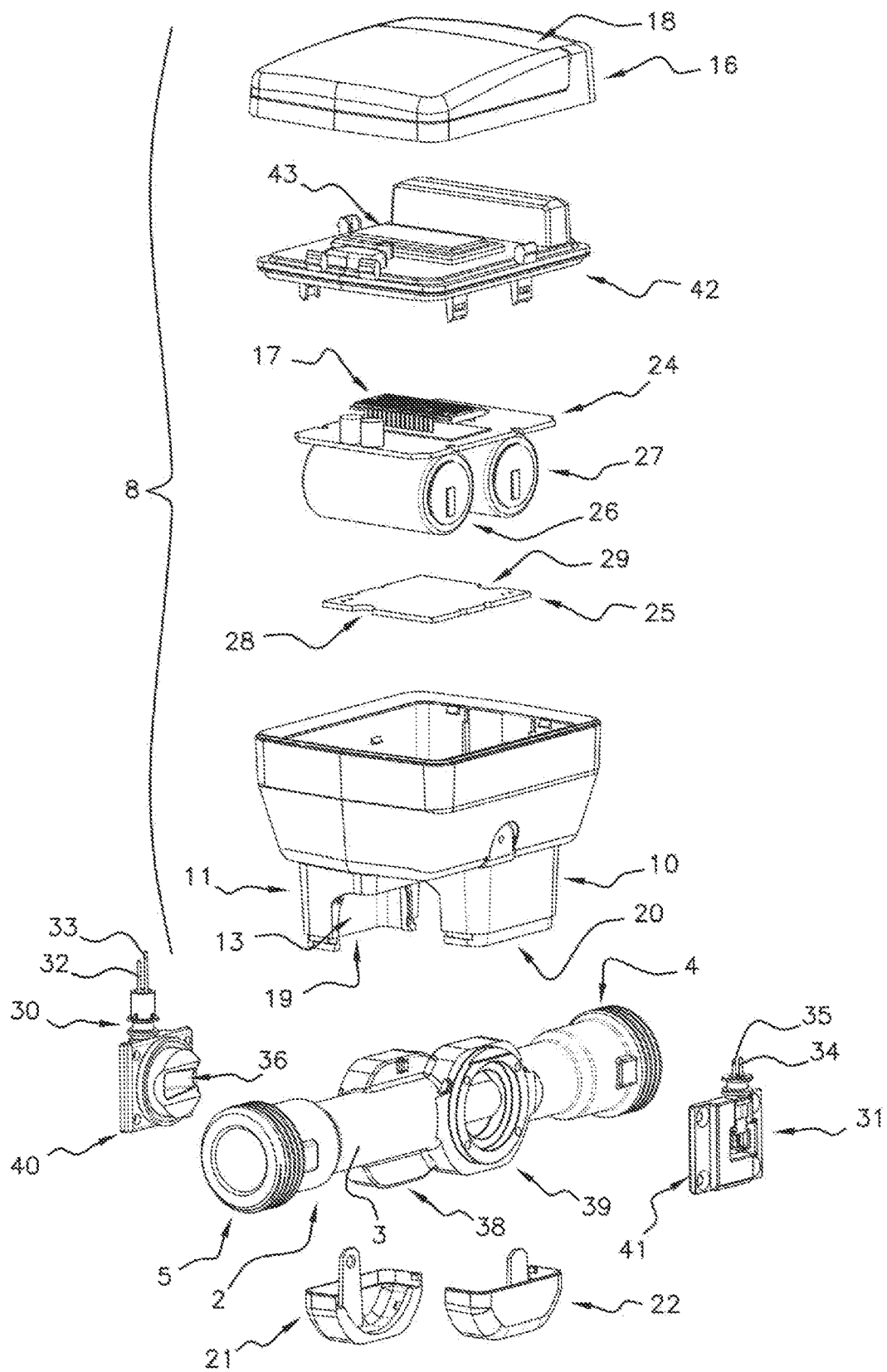

[Fig. 6]
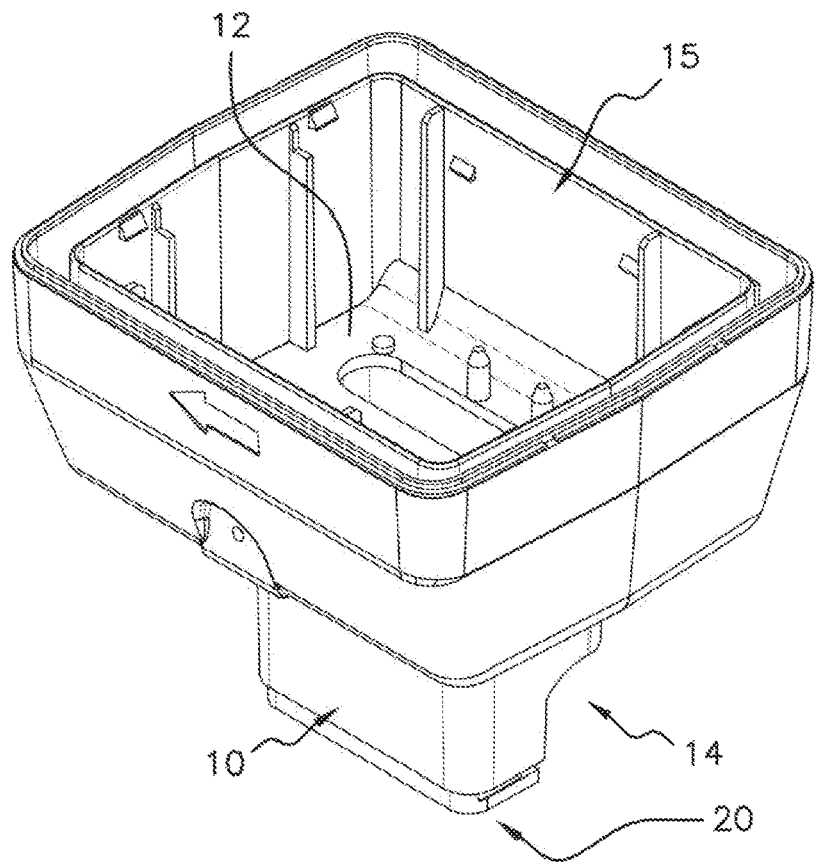
[Fig. 7]
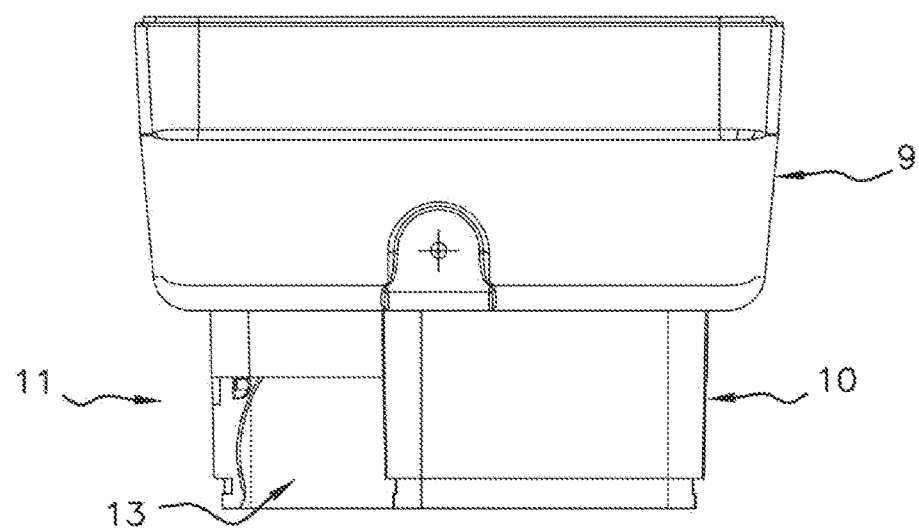

[Fig. 8]
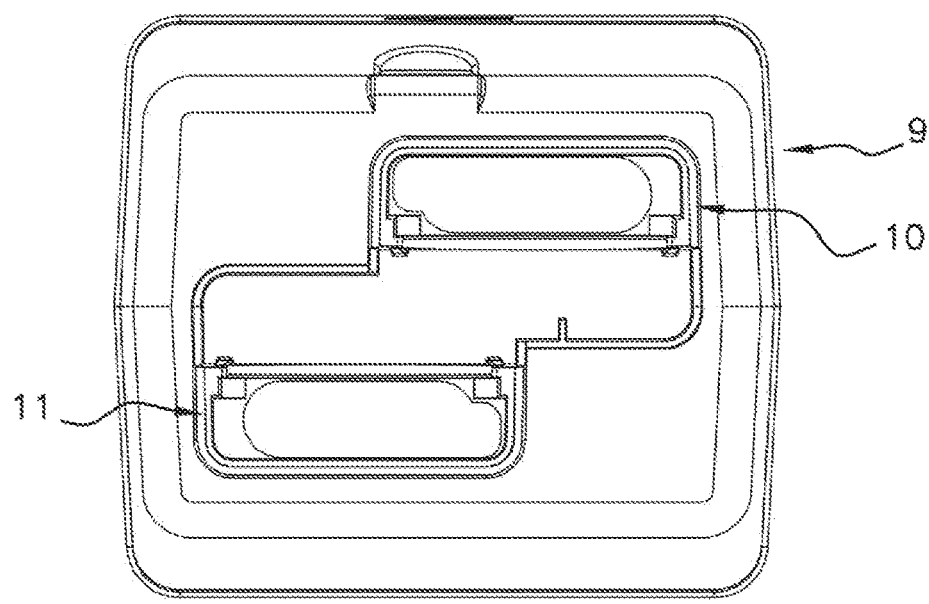
[Fig. 9]
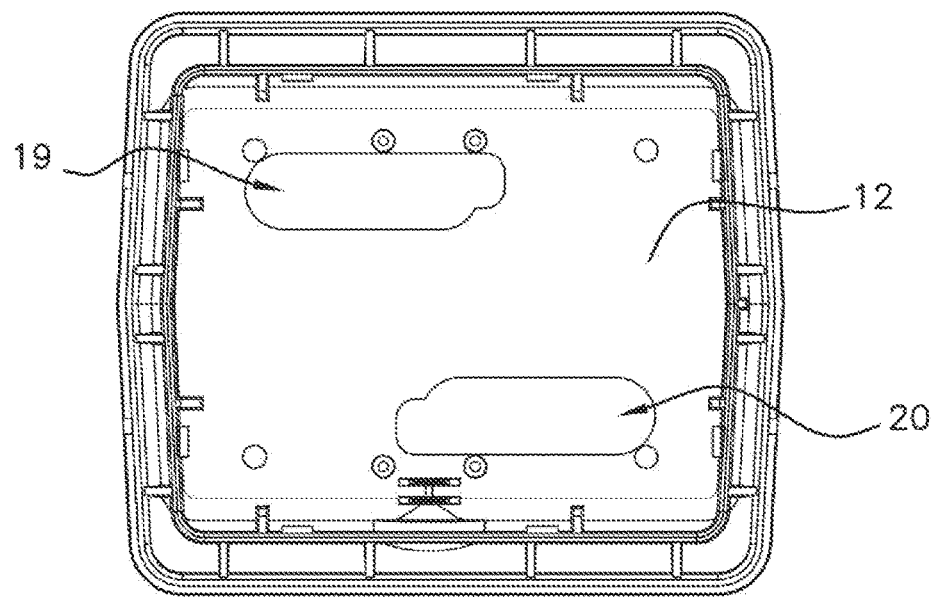

FLOW METER AND ASSEMBLY METHOD THEREFOR

RELATED APPLICATION

This application is a National Phase of PCT/FR2021/051100 filed on Jun. 17, 2021, which claims the benefit of priority from French Patent Application No. 20 06425, filed on Jun. 19, 2020, the entirety of which are incorporated by reference.

FIELD OF THE INVENTION

The invention concerns a flowmeter and its method of assembly.

Measuring a travel time of an ultrasound wave in a fluid by means of at least one ultrasound transducer enables deduction therefrom of the flowrate of the fluid. There exist numerous categories of ultrasound flowmeters in which the flowrate of a fluid is measured by the speed of propagation of an ultrasound wave in a fluid circulating in a pipe.

The present invention applies to flowmeters in which the transducer or at least its mounting device passes through the wall of the pipe to come into contact with the fluid the flowrate of which is to be measured and to flowmeters in which the transducers and/or their mounting device are installed outside the pipe and the measurement by which is effected by transmission of waves through the walls of the latter.

PRIOR ART

There is already known from the document FR 3 047 068 a mounting device for an ultrasound transducer adapted to be mounted through a wall of a flowmeter including a pipe, said device being adapted to orient an emission/reception direction of the transducer in a diagonal direction, also known as the measurement direction, at a predetermined angle to a longitudinal axis of the pipe in a plane of longitudinal symmetry of the latter.

Flowmeters including transducers oriented in this way with a measurement direction in a diagonal direction relative to the pipe generally have an overall size greater than other flowmeters with the transducers of which would in particular be disposed on the same side of the pipe. Flowmeters of this kind therefore have increased constraints compared to the arrangement and the assembly of the various components of said flowmeter.

OBJECTS AND SUMMARY

The invention therefore aims to propose a flowmeter that enables facilitated arrangement and fixing of the components of said flowmeter whilst limiting its overall size.

The invention also makes it possible to propose a flowmeter that can be mass produced at costs compatible with its use at the industrial scale and with an application in the usual uses, for example for the measurement of flowrate in water supply pipes.

To be more precise, the invention has for object a flowmeter including:
a pipe for measuring the flowrate of a fluid,
a first ultrasound transducer and a second ultrasound transducer, said ultrasound transducers being mounted facing one another relative to a wall of said pipe, said transducers being oriented in a measurement direction at a non-zero angle less than 90° to a longitudinal axis of the pipe,
characterized in that it further includes a casing including:
a main receptacle mounted on said pipe and delimiting a main internal volume;
a first sleeve and a second sleeve extending in a direction orthogonal to the longitudinal axis of said pipe, projecting from a bottom of the main receptacle and on either side of said pipe, the first sleeve being configured so as to cover said first ultrasound transducer at least partly so as to delimit an internal volume to receive said first ultrasound transducer and the second sleeve being configured so as to cover said second ultrasound transducer at least partly so as to delimit an internal volume to receive said second ultrasound transducer, the main internal volume of the main receptacle being in communication with said internal volume to receive said first ultrasound transducer and with said internal volume to receive said second ultrasound transducer.

Throughout the text the fact that the transducers are oriented in a measurement direction means that the principal faces (or emission/reception faces) of said transducers are orthogonal to said measurement direction or ultrasound wave emission/reception direction.

In some embodiments of the invention said flowmeter includes an electronic circuit card disposed inside said main receptacle and each of the first and second ultrasound transducers includes a piezoelectric plate and two conductive pins electrically connected to said electronic circuit card.

In some embodiments of the invention the two conductive pins of each ultrasound transducer are rigid and extend parallel to one another in a direction orthogonal to the plane of the electronic circuit card.

In some embodiments of the invention each transducer is fixed to said pipe by a mounting fixture.

In some embodiments of the invention the main receptacle includes a main opening and a main cover adapted to block said main opening.

In some embodiments of the invention said flowmeter further includes a display electrically connected to said electronic circuit card, said main cover defining a housing to receive said display and including a peripheral seal disposed around said housing to receive said display.

In some embodiments of the invention each sleeve includes an opening and the flowmeter further includes a secondary cover adapted to block each opening.

In some embodiments of the invention said flowmeter includes a packing material chosen in a group formed of thermoset resins, said packing material filling at least said main internal volume of the main receptacle. In particular, said packing material is chosen in the group formed of epoxide (or epoxy) resins, polyurethanes, silicones (in particular polydimethylsiloxanes (PDMS)), copolymers thereof and mixtures thereof.

In some embodiments of the invention said packing material totally fills said main internal volume of the main receptacle, the internal volume to receive said first ultrasound transducer and the internal volume to receive said second ultrasound transducer.

The invention also encompasses a method of assembling a flowmeter of this kind.

The invention therefore also concerns a method of assembling a flowmeter of this kind characterized in that it includes the following steps:

the first ultrasound transducer and the second ultrasound transducer are fixed to the pipe, the casing is mounted on said pipe so that the first sleeve covers said first ultrasound transducer at least partly so as to delimit the internal volume to receive said first ultrasound transducer and the second sleeve covers said second ultrasound transducer at least partly so as to delimit the internal volume to receive said second ultrasound transducer, the main internal volume of the main receptacle being in communication with said internal volume to receive said first ultrasound transducer and with said internal volume to receive second ultrasound transducer.

In some embodiments of the invention said method further includes a step in which the electronic circuit card is disposed inside said main receptacle.

In some embodiments of the invention, in said method, after mounting said casing on said pipe each conductive pin of each ultrasound transducer is electrically connected to said electronic circuit card.

In some embodiments of the invention, in said method, the packing material is introduced in liquid form via the opening of said first sleeve and/or the opening of said second sleeve. In some embodiments of the invention, in said method, each sleeve including an opening and the flowmeter further including a secondary cover adapted to block each opening, after electrically connecting each conductive pin to said electronic circuit card the packing material is introduced in liquid form via the openings of said first sleeve and of said second sleeve after which the openings are blocked by the secondary covers.

In some embodiments of the invention, in said method, the packing material is introduced in liquid form so as to completely to fill said main internal volume of the same receptacle, the internal volume receiving said first ultrasound transducer and the internal volume receiving said second ultrasound transducer.

In some embodiments of the invention, in said method, before said step during which the packing material is introduced in liquid form via at least said opening of said sleeves, each component of the flowmeter intended to be disposed in the main internal volume of the main receptacle is introduced. These components may optionally be pre-assembled together before they are mounted inside said main receptacle. This may for example refer to batteries, a second electronic circuit card, a display, etc. In particular, before said step during which the packing material is introduced in liquid form via at least one opening of said sleeves, said main opening of said main receptacle is blocked. To be more specific, before said step during which the packing material is introduced in liquid form said main cover is fixed over the main opening of said main receptacle.

In some embodiments of the invention, in said method, after introducing said packing material in liquid form, there is carried out a step of hardening, in particular a step known as polymerization, of said packing material.

In some embodiments of the invention, in said method, after carrying out said step of hardening said packing material and/or before said step of hardening said packing material, a secondary cover is fixed over the opening of said first sleeve and a secondary cover is fixed over the opening of said secondary sleeve.

The invention also concerns a flowmeter and a method characterized, in combination or not, by some or all of the features mentioned hereinabove or hereinafter. Whatever the formal presentation thereof, unless explicitly indicated to the contrary, the various features mentioned hereinabove or hereinafter must not be considered as closely or inextricably linked, as the invention may concern only one of these structural or functional features or only some of these structural or functional features or only part of one of those structural or functional features or again any group, combination or juxtaposition of some or all of these structural or functional features.

BRIEF DESCRIPTION OF THE DRAWINGS

Other aims, features and advantages of the invention will become apparent on reading the following description given by way of non-limiting example of some possible embodiments thereof that refers to the appended figures in which:

FIG. 1 is a perspective view of a flowmeter according to a first embodiment of the invention, FIG. 2 is a side view of a flowmeter according to the first embodiment of the invention, FIG. 3 is a view from above of a flowmeter according to the first embodiment of the invention, FIG. 4 is a side (front) view of a flowmeter according to the first embodiment of the invention, FIG. 5 is an exploded view of a flowmeter according to the first embodiment of the invention, FIG. 6 is a perspective view of the open casing of a flowmeter according to the first embodiment of the invention, FIG. 7 is a side view of the open casing of a flowmeter according to the first embodiment of the invention, FIG. 8 is a view from above of the open casing of a flowmeter according to the first embodiment of the invention, FIG. 9 is a view from below of the open casing of a flowmeter according to the first embodiment of the invention.

DETAILED DESCRIPTION

The flowmeter 1 represented in FIGS. 1 to 9 includes a pipe 2 adapted to allow the circulation of a fluid inside said pipe. The pipe 2 takes the general form of a tube 3 terminated at both ends by threaded connectors 4, 5. Between the connectors 4, 5, the pipe 2 can have a fluid passed through it. In the example represented the tube 3 includes two plates 38, 39 moulded into or machined onto the tube 3, diametrically opposite relative to the latter and offset relative to one another along the longitudinal axis of the pipe 2 for reasons that will be apparent in the remainder of the description. Each plate 38, 39 includes an orifice opening into the pipe 2.

A flowmeter 1 of this kind further includes a casing 8 including a main receptacle 9 mounted on said pipe 2 and delimiting a main internal volume. Said casing 8 also includes a first sleeve 10 and a second sleeve 11 extending in a direction orthogonal to the longitudinal axis of said pipe 2. Said first sleeve 10 and said second sleeve 11 project from a bottom 12 of the main receptacle 9 and on either side of said pipe 2. Each sleeve 10, 11 is configured so as to delimit, in particular with the wall of the pipe 2, an internal volume in communication with the main internal volume of the main receptacle 9. The pipe 2 is disposed between said first sleeve 10 and said second sleeve 11. For reasons that will be apparent in the remainder of the description the first sleeve 10 and the second sleeve 11 are not face to face but are offset relative to one another along the longitudinal axis of the pipe 2.

As can also be seen in the figures the pipe 2 is not inside the main internal volume of the casing 8. The casing of a flowmeter according to the invention therefore does not contain the pipe and does not need to surround it entirely. This has the advantage of enabling limitation of the overall size of the casing and therefore of the flowmeter 1.

Various embodiments may be envisaged where the dimensions and the shapes of said casing 8 are concerned, in particular those of said main receptacle 9 and said sleeves 10, 11. In the embodiment represented in FIGS. 1 to 9 the main receptacle 9 has a parallelepipedal general shape extended by said two sleeves 10, 11 from the bottom 12 of the main receptacle 9. The main receptacle 9 may have any other shape or again a cubic or cylindrical shape.

In the embodiment represented in FIGS. 1 to 9 each sleeve has, starting from the bottom 12 of the main receptacle 9, a parallelepipedal general shape of which a face disposed on the same side as the pipe 2 includes a recess 13, 14. In the embodiment represented in FIGS. 1 to 9 the internal volume associated with each sleeve 10, 11 is therefore also delimited by the wall of the pipe 2 on the recessed side of each sleeve 10, 11.

The main receptacle 9 of the casing 8 includes a main opening 15 and a main cover 16 able to block said main opening. In the variant represented in FIGS. 1 to 9 the bottom 12 of the main receptacle 9 is opposite the main opening 15 of the casing and the main cover 16 when it is in place to block the main opening 15. Nevertheless, there is nothing to prevent the main opening of the main receptacle being disposed differently, for example in place of at least one portion of a lateral wall of the main receptacle adjacent to said bottom. There is equally nothing to prevent the receptacle including a plurality of openings, said main opening of the main receptacle or said openings of the main receptacle being adapted to enable the introduction of the components to be introduced into the interior of the main internal volume of said main receptacle.

In the variant represented in FIGS. 1 to 9 the casing further includes a display 17 and the main cover 16 defines a housing to receive the display 17. In the embodiment represented this housing to receive said display includes a transparent porthole 18 enabling viewing of the data represented on the display 17. The transparent porthole 18 may include a peripheral seal. In the embodiment represented the casing 8 further includes a display plate 42 displayed under the main cover 16, the display plate 42 including a transparent porthole 43 enabling viewing of the data represented on the display 17 and a peripheral seal. In the embodiment represented the display plate 42 includes a peripheral seal adapted to provide a seal between the two faces of the plate 42. Additionally or alternatively it is equally possible for the main cover 16 to include this kind of peripheral seal. Moreover, a transparent resin may optionally be disposed between the display 17 and the transparent porthole 43 in order to prevent misting and to guarantee a good view of the display 17 through the porthole 43.

Moreover, each sleeve 10, 11 includes an opening 19, 20 and the flowmeter 1 further includes a secondary cover 21, 22 adapted to block each opening 19, 20. In other words, a first secondary cover 22 enables blocking of the opening 20 of the first sleeve 10 and a second secondary cover 21 enables blocking of the opening 19 of the second sleeve 11. In the variant represented in FIGS. 1 to 9 the opening of each sleeve 10, 11, is situated at the level of the distal end of said sleeve, that is to say the end at the greatest distance from the bottom 12 of the main receptacle of the casing, the "proximal end" of each sleeve being disposed at the level of the bottom 12 of the casing. Each secondary cover 21, 22 has a curved shape conjugate with the shape of the plates 38, 39. Each secondary cover 21, 22 can also have any other shape adapted to block each opening 19, 20 of each sleeve 10, 11, for example a parallelepipedal shape.

The opening 19, 20 of each sleeve advantageously makes possible, at the end of a process of assembling the various components of the flowmeter, the introduction of a packing material chosen in a group formed of thermoset resins. In particular, said packing material is chosen in a group formed of epoxide (or epoxy) resins, polyurethanes, silicones (in particular polydimethylsiloxanes (PDMS)), copolymers thereof and mixtures thereof. Heatset resins of this kind may be adapted to be polymerizable at room temperature (between 18° C. and 25° C. for example) or necessitate heating to a temperature greater than ambient temperature for a predetermined time (for example in an oven at 50° C. for 1 to 3 hours).

In a particularly advantageous variant the flowmeter therefore also includes a packing material filling said main internal volume of the main receptacle at least in part, and in particular said main internal volume of the main receptacle and the internal volume of each sleeve, and outside the housing to receive the display. The packing material may be introduced in the liquid state via the opening of each sleeve 10, 11.

A packing material of this kind has the advantage of protecting the electronic components of the flowmeter 1 (electronic circuit cards 24, 25, electrical connections, electrical cables, . . . ) from environmental conditions (atmosphere, moisture, water, . . . ) to which the flowmeter is subjected under conditions of use and furthermore enables consolidation of the assembly of the components constituting it with one another, in particular the electronic connectors, and thus in particular increasing the resistance of the flowmeter to mechanical vibrations. The packing material therefore enables consolidation of the assembly of the flowmeter by extending into each sleeve 10, 11 in contact with the components that it contains as well as the wall of the pipe 2 and around a portion of the pipe disposed between the sleeves of the casing.

In particular, in one variant of a flowmeter according to the invention at least one electronic circuit card 25 is disposed inside the main internal volume of said main receptacle. In the embodiment represented in FIGS. 1 to 9 and as can be seen in FIG. 5 in particular the electronic circuit card 25 is disposed parallel to the bottom 12 of the main receptacle. In a variant of a flowmeter according to the invention the flowmeter also includes at least one electrical accumulator such as a battery 26, 27, rechargeable or not, electrically connected to the electronic circuit card and disposed in the main internal volume of the main receptacle 9. In particular, in one variant of a flowmeter according to the invention a second electronic circuit card 24 may be disposed inside the main internal volume of said main receptacle. In the variant illustrated the first electronic circuit card 25 enables control of the ultrasound transducers 30, 31, execution of measurements linked to the ultrasound signals, calculation of the flowrate of fluids circulating in the pipe from this data, and therefore incrementation of the volume index of fluid that has passed through this pipe, while the second electronic circuit card 24 includes in particular a screen for the display 17 and possibly other data communication items (NFC, radio antenna for various protocols, wired communication, . . . ). The circuit card 24 may also include a microprocessor adapted to carry out calculations based on data supplied by the electronic circuit card 25 in order to communicate it in various formats. Each electronic circuit card 24, 25 may also include one or more cut-outs or notches 28, 29 on the edges of said electronic circuit card 25 and/or one or more holes or openings through its thickness in order to facilitate the passage of the packing material inside the main internal volume of the casing when the packing material is introduced via each opening 19, 20 of the sleeves. In combination with or instead of holes or cut-outs of this kind the electronic circuit card 25 and the casing 8 may equally be configured so that a lateral space is left free between at least one edge of the electronic circuit card 25 and the internal walls of the casing 8, thus allowing the packing material to expand inside the main internal volume of the main receptacle 9. Moreover, openings or notches of this kind may be conjugate with counterparts in the bottom 12 of the main receptacle 9 in order to provide a polarizer function during assembly.

A flowmeter according to the invention also includes a first ultrasound transducer 30 and a second ultrasound transducer 31, said ultrasound transducers being mounted on the pipe 2, facing one another and oriented in a measurement direction at a non-zero angle less than 90° to a longitudinal axis of the pipe 2. In particular, the ultrasound transducers 30, 31 are disposed diagonally relative to one another relative to the pipe 2. A disposition of this kind has the advantage of facilitating the connection of the ultrasound transducers 30, 31 to an electronic circuit card and in particular makes it possible to avoid the use of electrical wires for connecting them externally of the casing of a flowmeter. To be more precise, the two ultrasound transducers 30, 31 are placed on either side of a tubular section forming said pipe so as each is disposed in the internal volumes delimited by the first sleeve 10 and the second sleeve 11. In particular, in one variant of a flowmeter 1 according to the invention and as represented in the figures the ultrasound transducers 30, 31 are mounted through the wall of the pipe 2. In a particularly advantageous variant of a flowmeter according to the invention the angle between the measurement direction and the longitudinal axis of the pipe 2 is of the order of 30° but may be as much as 50° or even more depending on the flowmeter model.

In other words, thanks to the aforementioned offsetting of the two sleeves 10, 11 along the longitudinal axis of the pipe 2 the first sleeve 10 of the casing 8 covers said first ultrasound transducer 30 at least partly so as to delimit an internal volume to receive said first ultrasound transducer and the second sleeve 11 of the casing 8 covers said second ultrasound transducer 31 at least partly so as to delimit an internal volume to receive said second ultrasound transducer. As indicated above, the main internal volume of the main receptacle 9 is in communication with said internal volume to receive said first ultrasound transducer 30 and with said internal volume to receive said second ultrasound transducer 31.

In a particularly advantageous variant the two ultrasound transducers 30, 31 are assembled to the pipe 2 by mounting fixtures 40, 41, the sleeves 10, 11 and the secondary covers 21, 22 of the casing 8 surrounding these mounting fixtures.

In a particularly advantageous variant each of the first ultrasound transducer 30 and the second ultrasound transducer 31 includes a piezoelectric plate and two conductive pins 32, 33, 34, 35 electrically connected to the electronic circuit card 25. In particular, as can be seen in FIG. 5, the pins 32 and 33 connect the first ultrasound transducer 30 to the electronic circuit card 25 and the pins 34 and 35 connect the second ultrasound transducer 31 to the electronic circuit card 25. The two conductive pins 32, 33, 34, 35 of each ultrasound transducer are preferably rigid and extend parallel to one another in a direction orthogonal to the plane of the electronic circuit card 25, and are electrically connected to the electronic circuit card 25 by soldering them thereto. In particular, in the variant represented the pins 32, 33, 34, 35 are on the same side of the pipe, which enables the overall size of the flowmeter to be limited. This being so, the casing 8 is therefore advantageously retained on the pipe by means of the rigid conductive pins 32, 33, 34, 35 soldered to the electronic circuit card 25.

In a particularly advantageous variant each transducer 30, 31 is formed of a piezoelectric material plate and two conductive electrodes or pins. The piezoelectric material plate of each transducer 30, 31 may be protected by an external polymer material coating. In the variant represented in FIGS. 1 to 9 the main faces of the transducer are orthogonal to the ultrasound wave emission/reception direction. Each transducer is mounted so that the transducers are placed face to face and so that their respective emission/reception directions coincide with the measurement direction. In a particularly advantageous variant the first and second ultrasound transducers are mounted through the wall of the pipe 2.

In the variant represented in FIGS. 1 to 9, to orient the transducer in the measurement direction, each transducer 30, 31 includes on its active surface a central niche 36 the concavity of which is oriented toward the interior of the pipe 2, that is to say in the direction of the longitudinal axis. This niche 36 includes at least one plane face, termed the active face, orthogonal to the measurement direction. The other walls of the niche 36 may have any shape provided that these walls do not interfere with the ultrasound waves. For example, the niche includes an upper face parallel to the measurement direction and two lateral faces parallel to the plane of longitudinal symmetry of the pipe containing the measurement direction.

In order to prevent the niche forming a source of perturbations of the flow of fluid or of zones of stagnation of the latter, all the faces of the niche 36 are connected to one another and to the active surface by surfaces free of sharp edges. For example, all the plane surfaces are connected to one another by fillets of sufficient radius not to create turbulence in the streams of fluid. For example, for a niche from 10 to 15 mm deep the radii of the fillets are of the order of 0.5 to 1 mm.

The piezoelectric plate advantageously has a polygonal, in particular square or rectangular, contour or a disc general shape. The piezoelectric plate is used in its thickness resonant mode. In the variant represented in FIGS. 1 to 9 the piezoelectric plate may have a thickness less than 2 mm and dimensions between 3 mm and 10 mm in all directions orthogonal to its thickness.

Each piezoelectric plate consists of a piezoelectric material. This piezoelectric material must be able to emit and to receive ultrasound signals, in particular at a frequency of the order of 4 MHz. This material is for example a piezoelectric ceramic such as lead titanium zirconate (PZT). There is nothing to rule out using other piezoelectric materials such as monocrystals.

In order to assemble a flowmeter according to the invention some or all of the following steps may be carried out:
  the first ultrasound transducer 30 and the second ultrasound transducer 31 are first fixed to the pipe 2,
  the casing 8 is then mounted on said pipe 2 so that the first sleeve 10 covers said first ultrasound transducer 30 at least partly in order to delimit the internal volume to receive said first ultrasound transducer and so that the second sleeve 11 covers said second ultrasound transducer 31 at least partly so as to delimit the internal volume to receive said second ultrasound transducer;

the electronic circuit card 25 is disposed in said main receptacle 9, this step being carried out either before or after the preceding step;

after mounting said casing 8 on said pipe 2, each conductive pin 32, 33, 34, 35 of each ultrasound transducer 30, 31 is electrically connected to said electronic circuit card 25, preferably by soldering it thereto;

in a preferred embodiment of the flowmeter 1 in which each sleeve 10, 11 includes an opening 19, 20 and the flowmeter further includes a secondary cover 21, 22 adapted to block each opening, after electrically connecting each conductive pin 32, 33, 34, 35 to said electronic circuit card 25 the packing material is introduced in liquid form via the distal openings of said first sleeve and said second sleeve, after which the openings 19, 20 of each sleeve 10, 11 are blocked by the secondary covers 21, 22, a step is carried out of hardening, in particular polymerizing, said packing material.

In a preferred embodiment of the flowmeter 1, before the introduction of said packing material, the display 17 is assembled onto the second electronic circuit card 24 together with the electrical accumulators 26, 27, with the display plate 42, and they are thus disposed pre-assembled in said main internal volume of the main receptacle.

The arrangement of the components disposed in the internal space of the casing 8 is such that the packing material is able to expand in the liquid state in the internal space of the casing, in particular through holes in the electronic circuit card.

In particular during the introduction of the packing material in liquid form via the openings 19, 20 of said first sleeve 10 and said second sleeve 11 the flowmeter is disposed so that the openings 19, 20 of the sleeves 10, 11 are oriented upward (i.e. as in the view from above of the casing 8 in FIG. 8 or after rotation of the order of 180° of the flowmeter about the longitudinal axis of the pipe 2 as represented in FIGS. 1 and 2, the secondary covers 21, 22 being removed from the sleeves 10, 11 to enable introduction of the packing material).

A packing material may equally be disposed so as to fill the housing to receive the display 17 so as to avoid the presence of moisture in this housing to receive the display. Alternatively, the display may be glued to the porthole of the main cover 16 or a moisture absorbing material may be disposed in the receiving housing. If the packing material used in said flowmeter 1 fills the housing to receive the display 17 a transparent packing material is used.

A flowmeter according to the invention further exhibits a reliability, service life and resistance to aggressive environments, in particular liquid media, enabling its use for commercial or regulatory purposes.

The invention is open to numerous variants and applications other than those described hereinabove. In particular, it goes without saying that unless indicated to the contrary the various structural and functional features of each of the embodiments described hereinabove must not be considered as combined and/or closely and/or intrinsically linked to one another, but to the contrary as simple juxtapositions. Moreover, the structural and/or functional features of the various embodiments described hereinabove may be the object in whole or in part of any different juxtaposition or of any different combination. For example, the sleeves may equally have a cylindrical or semi-cylindrical shape.

The invention claimed is:

1. A flowmeter comprising:
a pipe for measuring the flowrate of a fluid,
a first ultrasound transducer and
a second ultrasound transducer, said ultrasound transducers being mounted facing one another relative to a wall of said pipe,
said transducers being oriented in a measurement direction at a non-zero angle less than 90° to a longitudinal axis of the pipe,
wherein said flowmeter further includes a casing including:
a main receptacle mounted on said pipe and delimiting a main internal volume;
a first sleeve and a second sleeve extending in a direction orthogonal to the longitudinal axis of said pipe, projecting from the main internal volume of the main receptacle and on either side of said pipe, wherein said pipe is not inside the main internal volume of the casing,
the first sleeve being configured so as to cover said first ultrasound transducer at least partly so as to delimit an internal volume to receive said first ultrasound transducer and the second sleeve being configured so as to cover said second ultrasound transducer at least partly so as to delimit an internal volume to receive said second ultrasound transducer,
the main internal volume of the main receptacle being in communication with said internal volume of said first sleeve to receive said first ultrasound transducer and with said internal volume of said second sleeve to receive said second ultrasound transducer.

2. The flowmeter as claimed in claim 1, wherein said flowmeter includes an electronic circuit card disposed inside said main receptacle and in that the first and second ultrasound transducers each include a piezoelectric plate and two conductive pins electrically connected to said electronic circuit card.

3. The flowmeter as claimed in claim 2, wherein said flowmeter the two conductive pins of each ultrasound transducer are rigid and extend parallel to one another in a direction orthogonal to the plane of the electronic circuit card.

4. The flowmeter as claimed in claim 1, wherein each transducer is fixed to said pipe by a mounting fixture.

5. The flowmeter as claimed in claim 1, wherein the main receptacle includes a main opening and a main cover adapted to block said main opening.

6. The flowmeter as claimed in claim 5, wherein said flowmeter further includes a display electrically connected to said electronic circuit card, said main cover defining a housing to receive said display and including a peripheral seal disposed around said housing to receive said display.

7. The flowmeter as claimed in claim 1, wherein each sleeve includes an opening and in that the flowmeter further includes a secondary cover adapted to block each opening.

8. The flowmeter as claimed in claim 1, wherein said flowmeter includes a packing material chosen in a group formed of thermoset resins, said packing material filling at least said main internal volume of the main receptacle.

9. The flowmeter as claimed in claim 8, wherein said packing material totally fills said main internal volume of the main receptacle, the internal volume to receive said first ultrasound transducer and the internal volume to receive said second ultrasound transducer.

10. A method of assembling a flowmeter as claimed in claim 1, wherein said method includes the following steps:

the first ultrasound transducer and the second ultrasound transducer are fixed to the pipe, the casing is mounted on said pipe so that the first sleeve covers said first ultrasound transducer at least partly so as to delimit the internal volume to receive said first ultrasound transducer and the second sleeve covers said second ultrasound transducer at least partly so as to delimit the internal volume to receive said second ultrasound transducer, the main internal volume of the main receptacle being in communication with said internal volume to receive said first ultrasound transducer and with said internal volume to receive second ultrasound transducer.

11. The method as claimed in claim 10, wherein said flowmeter further includes a step in which an electronic circuit card is disposed inside said main receptacle.

12. The method as claimed in claim 11, wherein said flowmeter includes an electronic circuit card disposed inside said main receptacle and in that the first and second ultrasound transducers each include a piezoelectric plate and two conductive pins electrically connected to said electronic circuit card, and wherein, after mounting said casing on said pipe, each conductive pin of each ultrasound transducer is electrically connected to said electronic circuit card.

13. The method as claimed in claim 12, wherein, each sleeve including an opening and the flowmeter further including a secondary cover adapted to block each opening, after electrically connecting each conductive pin to said electronic circuit card packing material is introduced in liquid form via the openings of said first sleeve and of said second sleeve after which the openings are blocked by the secondary covers.

* * * * *